(12) United States Patent
Garnemark et al.

(10) Patent No.: US 12,258,915 B2
(45) Date of Patent: Mar. 25, 2025

(54) ENGINE SYSTEM (71) Applicant: VOLVO TRUCK CORPORATION, Gothenburg (SE)

(72) Inventors: Oscar Garnemark, Torslanda (SE); Ulf Aronsson, Lund (SE); Fredrik Rahm, Hörby (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/543,640

(22) Filed: Dec. 18, 2023

(65) Prior Publication Data

US 2024/0209807 A1 Jun. 27, 2024

(30) Foreign Application Priority Data

Dec. 22, 2022 (EP) .................................. 22215767

(51) Int. Cl.
*F02D 41/00* (2006.01)
*F02B 37/00* (2006.01)
(Continued)

(52) U.S. Cl.
CPC ........ *F02D 41/0007* (2013.01); *F02B 37/001* (2013.01); *F02B 37/007* (2013.01); *F02B 37/10* (2013.01); *F02B 37/162* (2019.05); *F02B 39/10* (2013.01); *F02D 41/18* (2013.01); F02B 2037/122 (2013.01); F02B 2037/125 (2013.01); F05D 2220/40 (2013.01); F05D 2270/101 (2013.01)

(58) Field of Classification Search
CPC ................. F02D 41/0007; F02D 41/18; F02D 2200/0406; F05D 2220/40; F05D 2270/101; F02B 37/162; F02B 39/04; F02B 2037/122; F02B 2037/125; F02B 37/007; F02B 37/10; F02B 39/10; F02B 37/001; Y02T 10/12
See application file for complete search history.

(56) References Cited

U.S. PATENT DOCUMENTS

| 6,871,498 B1 | 3/2005 | Allen et al. |
| 10,731,577 B2 | 8/2020 | Kelly et al. |
| (Continued) | | |

FOREIGN PATENT DOCUMENTS

| DE | 102017200948 A1 | 8/2017 |
| DE | 102018207829 A1 | 12/2019 |
| FR | 3059720 A1 | 6/2018 |

OTHER PUBLICATIONS

Extended European Search Report in corresponding European Search Report in corresponding European Application No. 22215767.9 dated Jun. 2, 2023 (8 pages).

(Continued)

*Primary Examiner* — Brandon D Lee
(74) *Attorney, Agent, or Firm* — Venable LLP; Jeffri A. Kaminski (57) ABSTRACT

An engine system for a vehicle is provided. The engine system includes a first and a second turbine arrangement arranged in parallel with each other. A rotational speed of a first turbo arrangement is controlled in response to a distance between a first compressor map position and a surge line of a compressor map being below a predetermined threshold distance.

13 Claims, 6 Drawing Sheets

(51) Int. Cl.
*F02B 37/007* (2006.01)
*F02B 37/10* (2006.01)
*F02B 37/12* (2006.01)
*F02B 37/16* (2006.01)
*F02B 39/10* (2006.01)
*F02D 41/18* (2006.01)

(56) References Cited

U.S. PATENT DOCUMENTS

| | | |
|---|---|---|
| 2003/0051475 A1 | 3/2003 | Allen et al. |
| 2009/0198432 A1* | 8/2009 | Tabata ............... F02D 23/02 |
| | | 701/103 |
| 2014/0190163 A1 | 7/2014 | Maier |
| 2016/0272188 A1* | 9/2016 | Bowman ............ B60W 20/10 |
| 2017/0226924 A1* | 8/2017 | Stoffels ............. F02B 37/007 |
| 2017/0260916 A1* | 9/2017 | Kraemer ............. F02B 75/20 |
| 2019/0186390 A1* | 6/2019 | Kelly ................. F02B 39/10 |
| 2023/0272737 A1* | 8/2023 | Blythe ................ F02B 37/04 |
| | | 60/773 |

OTHER PUBLICATIONS

European Communication pursuant to Article 94(3) EPC dated Feb. 4, 2025 in corresponding European Patent Application No. 22215767.9, 5 pages.

* cited by examiner

ENGINE SYSTEM

TECHNICAL FIELD

The inventive concept relates generally to engines for vehicles. In particular aspects, the inventive concept relates to an engine system. The inventive concept can be applied in heavy-duty vehicles, such as trucks, buses, and construction equipment. Although the inventive concept may be described with respect to a particular vehicle, the inventive concept is not restricted to any particular vehicle.

BACKGROUND

Internal combustion engines belong to conventional vehicle technology. In order to reduce environmentally harmful exhaust gases, hydrogen internal combustion engines are becoming a potential solution, i.e. instead of combusting diesel or petrol, combustion is performed by the use of hydrogen gas as the ignitable gas in the combustion chamber.

There is however a particular demand for a boosting system of a hydrogen internal combustion engine, since e.g. a high lambda value is desirable in combination with a low level of residual gases. A high lambda value can be obtained by traditional free floating turbo systems, but will give a high back pressure and potential problems with residual gases. High lambda concepts may also be limited by peak cylinder pressure, inlet manifold pressure and exhaust manifold pressure.

There is thus a desire to further develop engine systems to alleviate at least some of the above described deficiencies.

SUMMARY

According to a first aspect of the inventive concept, there is provided an engine system for a vehicle, the engine system comprising a first turbo arrangement comprising a first turbine and a first compressor operably connected to each other, the first turbine being configured to be arranged in downstream fluid communication with an internal combustion engine, a second turbo arrangement comprising a second turbine and a second compressor operably connected to each other, the second turbine being configured to be arranged in downstream fluid communication with the internal combustion engine in parallel with the first turbine, wherein the first and second turbo arrangements are individually controllable, and a control unit comprising a processor device operable to individually control a rotational speed of the first and second turbo arrangements, respectively, the processor device being configured to determine a first pressure and a first mass flow of air pressurized by the first compressor, and a second pressure and a second mass flow of air pressurized by the second compressor, determine a first compressor map position of the air pressurized by the first compressor, the first compressor map position being a position, defined by the first pressure and the first mass flow, within a compressor map, the compressor map defining a surge line, and control the rotational speed of the first turbo arrangement in response to a distance between the first compressor map position and the surge line being below a predetermined threshold distance.

The above definition compressor map should preferably be construed as a graph defining a relationship between pressure and mass flow, where a position within the compressor map defines a performance of the compressor. Thus, by means of the compressor map, the current performance of the compressor can be determined by the specific position, i.e. the first and second compressor map positions, defined by the instant pressure and the mass flow of the respective compressor. The compressor map may be designed from compressor rig tests or predicted/estimated from simulations. The compressor map may be similar for the first and second compressors. Alternatively, the first compressor may operate within a first compressor map, while the second compressor may operate within a second compressor map which is different from the first compressor map.

As defined above, the compressor map defines a surge line. The surge line should preferably be construed as positions where the compressor will be exposed to stalling. Thus, when a compressor map position of the compressor is on, or close to, the surge line, there is a risk that the compressor will stall. This may cause an abrupt reversal of airflow in the compressor which is undesirable as the compressor may become unable to hold back a higher pressure downstream. The compressor map may also define a choke line. When the position defined by the pressure and the mass flow falls outside the choke line, the compressor will be exposed to choke. The wording "pressure" should be construed as also include "pressure ratio". The first and second compressors may have different pressure ratios, i.e. a ratio of the pressure upstream the compressor and a pressure downstream the compressor, while having the same pressure downstream the respective first and second compressors.

Further, the wording "downstream the internal combustion engine" should preferably be construed as downstream combustion chamber such that the first and second turbines receive combustion gas exhausted from the internal combustion engine. The first and second turbines may preferably be connectable downstream an exhaust manifold of the internal combustion engine, or downstream a first and second exhaust manifold, respectively.

The inventive concept is based on the insight that parallel turbo arrangements, i.e. the first and second turbo arrangements, downstream the internal combustion engine can efficiently optimize boosting of the engine system. In particular, an engine system with parallel turbo arrangements may advantageously improve pulse utilization and thereby improve the overall efficiency of the engine system. In particular, the first and second turbo arrangements can be designed with a total lower inertia compared to the same capacity using a single turbo arrangement. However, the use of parallel turbo arrangements may be sensitive to surge problems for one of the compressors as the pressure and mass flow downstream one of the first and second compressors affects the compressor map position of the other one of the first and second compressors. The first aspect of the inventive concept may thus seek to solve the problem of surge in a compressor forming part of a parallel turbine arrangement by using individually controllable turbine arrangements, and to individually control the rotational speed of the first turbo arrangement to continuously maintain the first compressor map position at a distance from the surge line. A technical benefit of the inventive concept may hence include that an efficient engine system is provided with a low surge risk of the compressors. The operability of the engine system can thus be improved, i.e. the engine system can be operated at a relatively high air utilization ratio.

In some examples, the rotational speed of the first turbo arrangement may be controlled such that the distance between the first compressor map position and the surge line is above a critical threshold distance. The critical threshold distance may be a zero distance from the surge line, or a distance which is smaller than the predetermined threshold distance. The rotational speed of the first turbo arrangement is thus controlled to avoid the first compressor map position to align, or even cross, the surge line, i.e. keep the first compressor map position sufficiently far away from the surge line. The rotational speed may be controlled by a feed forward loop.

In some examples, the processor device may be configured to, in response to the distance between the first position and the surge line being below the predetermined threshold distance, control the rotational speed of the first turbo arrangement such that the air pressurized by the first compressor assumes an updated compressor map position, wherein a distance between the updated compressor map position and the surge line is above the predetermined threshold distance. A technical advantage may include that the first compressor map position is controlled to be arranged at a sufficient distance from the surge line, further reducing the risk of surge.

In some examples, the processor device may be further configured to determine a second compressor map position of the air pressurized by the second compressor, the second compressor map position being a position, defined by the second pressure and the second mass flow, within the predefined compressor map. A technical advantage may include that also the second turbo arrangement can be controlled if the second compressor map position is too close to the surge line.

In some examples, the processor device may be further configured determine a first turbo rotational speed of the first turbo arrangement, the first turbo rotational speed providing a compressor map position of the air pressurized by the first compressor to substantially coincide with the second compressor map position, and control the rotational speed of the first turbo arrangement by controlling the rotational speed of the first turbo arrangement to assume the first turbo rotational speed.

The wording "substantially coincide" should be construed such that the pressure and the mass flow of the first and second compressors are substantially the same. The first pressure and the first mass flow may slightly deviate from the second pressure and the second mass flow, respectively while still falling within the definition of "substantially coincide". The difference in pressure and mass flow may be within predetermined tolerance ranges to still fall within the definition of "substantially coincide". Put it differently, the definition "substantially coincide" may allow a difference between the first and second pressure within a predetermined pressure range and a difference between the first and second mass flows within a predetermined mass flow range.

A technical advantage may include that the first and second turbo arrangements operate as substantially the same position within the compressor map, thereby enabling for an even further efficiency of the engine system.

In some examples, the first turbo arrangement may be a first electrically controlled turbo arrangement. A technical advantage may include that an electrically controlled turbo arrangement can be rapidly controlled when the first compressor map position is too close to the surge line.

In some examples, the first electrically controlled turbo arrangement may comprise a first electric motor between the first turbo and the first compressor. In some examples, the first electric motor may be operably coupled to the processor device.

In some examples, the second turbo arrangement may be a second electrically controlled turbo arrangement. A technical advantage may include that an electrically controlled turbo arrangement can be rapidly controlled when the second compressor map position is too close to the surge line.

In some examples, the second electrically controlled turbo arrangement may comprise a second electric motor between the second turbo and the second compressor. In some examples, the second electric motor may be operably coupled to the processor device.

In some examples, the engine system may further comprise a secondary air pressure arrangement arranged in downstream fluid communication with each of the first and second compressors. A technical advantage may be that the pressure level of the air fed into the internal combustion engine can be further increased, thereby improving boosting of the internal combustion engine, thus enabling for improved overall efficiency of the engine system. A positive pressure ratio over the internal combustion engine can be obtained which improves scavenging and may increase cylinder charging.

A further technical advantage of a secondary air pressure arrangement downstream the first and second compressors may be that the engine system may be continuously over-boosted by the secondary air pressure arrangement. Hereby, so-called "ultra-lean" control of the engine system may be obtainable whereby a reduced level of NOx is formed in the combustion gases exhausted from the internal combustion engine, in particular when the internal combustion engine is a hydrogen internal combustion engine. The reduction may result in substantially zero NOx emissions. This may in turn enable for the omission of a catalyst, such as e.g. a DeNOx catalyst or NOx reduction catalyst for a complete internal combustion engine arrangement onto which the engine system is mounted.

The secondary air pressure arrangement, in combination with the individually controllable first and second turbo arrangements may thus enable for improved NOx suppression with high lambda levels and low levels of residual gases.

In some examples, the secondary air pressure arrangement may be a mechanical supercharger operatively connectable to a crankshaft of the internal combustion engine. The mechanical supercharger may be a so-called roots blower. A roots blower may be advantageous since it is simple in design and functionality, and can efficiently develop a positive pressure over the engine, i.e. a higher pressure at the intake manifold compared to the pressure at the exhaust manifold.

In some examples, the mechanical supercharger may be operatively connectable to the crankshaft by a fixed gear ratio. A technical advantage may be that a relatively simple installation is obtained.

In some examples, the mechanical supercharger may be operatively connectable to the crankshaft by a variable gear ratio. A technical advantage may be that the pressure and mass flow downstream the first and second compressors may be controlled by varying the rotational speed, and thus the obtained pressure level, of the mechanical supercharger. The first and second compressor map positions may hereby be controlled by varying the operation of the mechanical supercharger.

In some examples, the engine system may further comprise a by-pass conduit bypassing the secondary air pressure arrangement. A technical advantage may be that the first and second compressor map positions may be controlled by controllably by-passing the secondary air pressure arrangement.

In some examples, the by-pass conduit may comprise a by-pass valve. A technical advantage may be that a by-pass valve can be easily controllable. In some examples, the by-pass valve may be an adjustable valve, such as e.g. a throttle. A technical advantage may be that the secondary air pressure arrangement can be by-passed from zero by-pass up to 100 percent by-passing.

In some examples, the engine system may further comprise a charge air cooler arranged in downstream fluid communication with each of the first and second compressors. A technical advantage may be that the temperature level of the pressurized air from the first and second compressors can be reduced before entering the secondary air pressure arrangement, whereby an increased compression ratio can be obtained.

In some examples, the charge air cooler may be arranged in upstream fluid communication with the secondary air pressure arrangement.

In some examples, the processor device may be further configured to determine a lambda value of combustion gas exhausted from the internal combustion engine, and control the rotational speed of at least one of the first and second turbo arrangements in response to the lambda value being outside a predetermined lambda threshold range.

Preferably, the engine system is further configured to receive a lambda value from a lambda sensor or a lambda model.

A technical advantage may be that the lambda value of the combustion gases exhausted from the internal combustion engine can be controlled by individually controlling the first and second turbo arrangements. According to a non-limiting example, the rotational speed of the first and second turbo arrangements may be increased when the lambda value is low and there is a desire for an increase. In a similar vein, the rotational speed of the first and second turbo arrangements may be reduced when the lambda value is high and there is a desire for a reduction.

According to a second aspect, there is provided a vehicle comprising an internal combustion engine and an engine system according to any one of the above described examples, wherein the engine system is connected to internal combustion engine.

In some examples, the internal combustion engine may be a hydrogen internal combustion engine. Preferably, the hydrogen internal combustion engine comprises a spark plug.

In some examples, the internal combustion engine may comprise at least a first exhaust manifold and second exhaust manifold, the first turbine being arranged in downstream fluid communication with the first exhaust manifold, and the second turbine being arranged in downstream fluid communication with the second exhaust manifold.

Further effects and features of the second aspect are largely analogous to those described above in relation to the first aspect.

According to a third aspect, there is provided a method of controlling an engine system connected to an internal combustion engine, the engine system comprising a first turbo arrangement comprising a first turbine and a first compressor operably connected to each other, the first turbine being arranged in downstream fluid communication with the internal combustion engine, and a second turbo arrangement comprising a second turbine and a second compressor operably connected to each other, the second turbine being arranged in downstream fluid communication with the internal combustion engine in parallel with the first turbine, wherein the first and second turbo arrangements are individually controllable, the method comprising determining a first pressure and a first mass flow of air pressurized by the first compressor, and a second pressure and a second mass flow of air pressurized by the second compressor, determining a first compressor map position of the air pressurized by the first compressor, the first compressor map position being a position, defined by the first pressure and the first mass flow, within a compressor map, wherein the compressor map defines a surge line, and controlling the rotational speed of the first turbo arrangement in response to a distance between the first position and the surge line being below a predetermined threshold distance.

Effects and features of the third aspect are largely analogous to those described above in relation to the first and second aspects.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the inventive concept as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the inventive concept cited as examples.

DETAILED DESCRIPTION

Aspects set forth below represent the necessary information to enable those skilled in the art to practice the inventive concept.

The inventive concept may seek to improve an overall efficiency of an engine system with parallel turbo arrangements. A technical benefit may include that surge may be avoided for the compressors of the parallel turbo arrangements.

Figure 1:
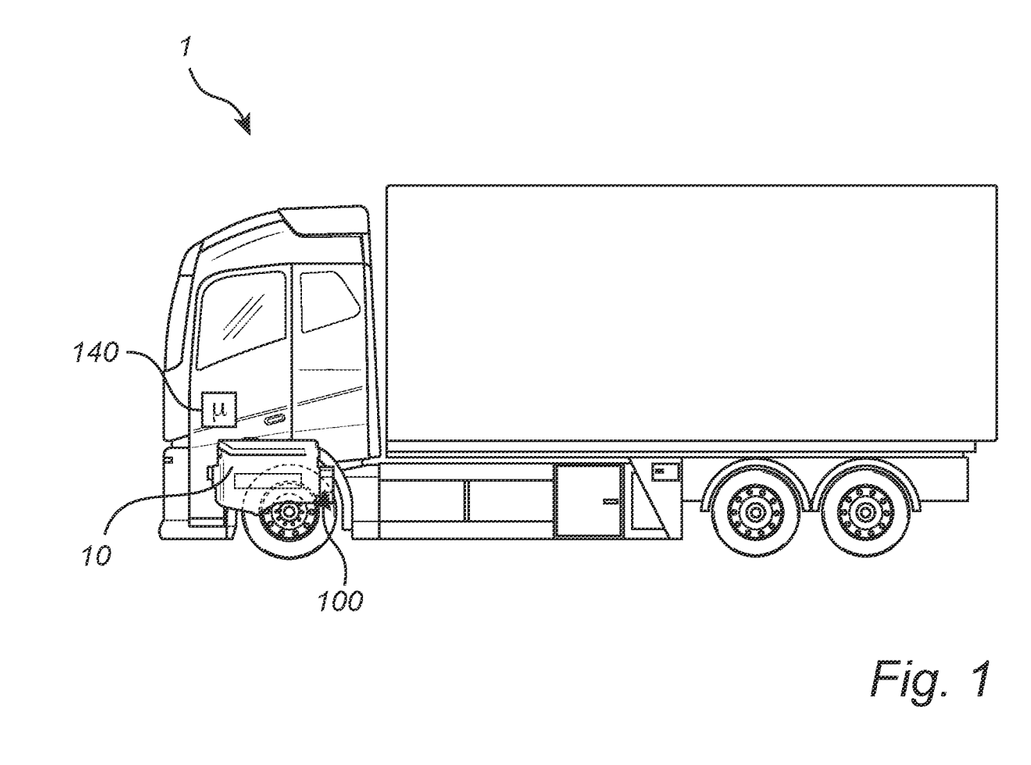
FIG. 1 is an exemplary illustration of a vehicle according to one example.

Turning to FIG. 1 which is an exemplary illustration of a vehicle 1 according to one example. The vehicle 1 in FIG. 1 is exemplified as a truck, but the below described inventive concept may be provided in other vehicles, such as e.g. working machines, buses, cars, etc. The vehicle 1 comprises an internal combustion engine 10. The internal combustion engine 10 is preferably a hydrogen internal combustion engine. In such case, the hydrogen internal combustion engine receives hydrogen gas for combustion in the combustion chamber(s). As will be evident from the below description, the vehicle 1 further comprises an engine system 100 connected to the internal combustion engine 10. The engine system 100 also comprises a control unit 140. The control unit 140 comprises a processor device configured to control the engine system 100 as will be described in further detail below.

Figure 2:
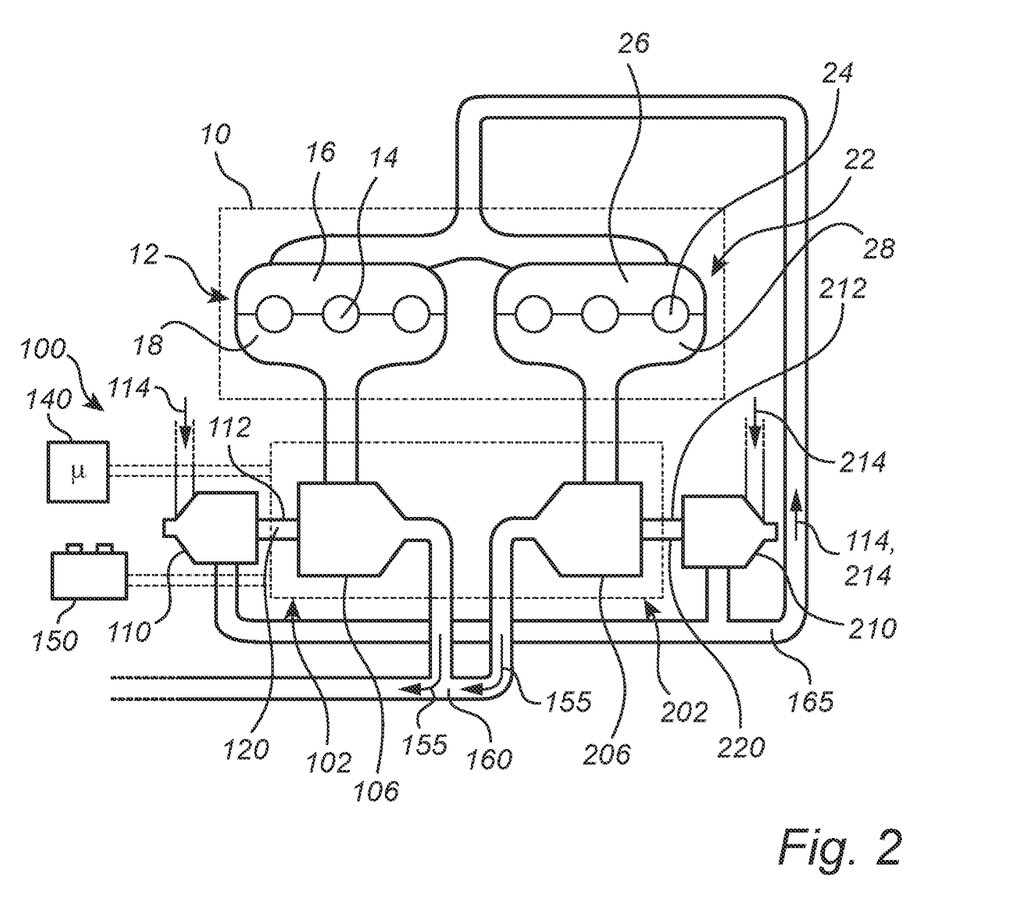
FIG. 2 is an exemplary illustration of an engine system according to one example.

In order to describe the engine system 100 in further detail, reference is now made to FIG. 2, which is an exemplary illustration of the engine system 100 according to one example. As can be seen, the engine system 100 is connected to the internal combustion engine 10. The exemplified internal combustion engine 10 comprises a first cylinder package 12, in FIG. 2 exemplified as comprising three combustion chambers 14, a first inlet manifold 16 and a first exhaust manifold 18. The exemplified internal combustion engine 10 also comprises a second cylinder package 22, in FIG. 2 exemplified as comprising three combustion chambers 24, a second inlet manifold 26 and a second exhaust manifold 28. Air is thus fed into each of the first 16 and second 26 inlet manifolds, and combustion gas from the first cylinder package 12 is exhausted to the engine system 100 via the first exhaust manifold 18, while combustion gas from the second cylinder package 22 is exhausted to the engine system 100 via the second exhaust manifold 28.

The engine system 100 comprises a first turbo arrangement 102 and a second turbo arrangement 202, where the first 102 and second 202 turbo arrangements are arranged in parallel with each other. In detail, the first turbo arrangement 102 comprises a first turbine 106 which is connected in downstream fluid communication with the first exhaust manifold 18, and the second turbo arrangement 202 comprises a second turbine 206 which is connected in downstream fluid communication with the second exhaust manifold 28. Accordingly, the first 106 and second 206 turbines receives combustion gases exhausted from the internal combustion engine 10 in parallel.

The first turbo arrangement 102 further comprises a first compressor 110 operably connected to the first turbine 106. In particular, a first turbo shaft 112 is connecting the first turbine 106 and the first compressor 110 to each other. The first turbine 106 is operated to rotate by the flow of combustion gases it receives, whereby the first compressor 110 rotates to pressurize a flow of air 114 fed into an inlet of the first compressor 110. In addition to the flow of combustion gases exposing the first turbo arrangement 102 to achieve a rotational motion, the rotation of the first turbo shaft 112 can be controlled to increase and/or decrease by other means than the flow of combustion gases from the internal combustion engine 10. For example, the rotation can be controlled by controlling the flow of exhaust gases fed to the first turbo, such as e.g. by means of bypass valve, or by using a variable turbo geometry (VTG). The rotation may also be controlled mechanically by a variable gear ratio. Preferably, and according to an example, the controllable first turbo arrangement 102 comprises a first electric machine 120 configured to control the rotational speed of the first turbo shaft 112. The first turbo arrangement 102 may thus be referred to as a first electrically controlled turbo arrangement. According to an example, the first electric machine 120 is arranged between the first turbine 106 and the first compressor 110, i.e. the first electric machine 120 is arranged in, or constitutes, the first turbo shaft 112. Such first electric machine 120 preferably comprises a first rotor and a first stator.

The first electric machine 120 is preferably connected to the above described control unit 140. Thus, the processor device of the control unit 140 is configured to control the rotational speed of the first turbo arrangement 102. The first electric machine 120 is also preferably connected to an energy storage 150, preferably a battery, in order to receive electric power for its propulsion.

In a similar vein, the second turbo arrangement 202 further comprises a second compressor 210 operably connected to the second turbine 206. In particular, a second turbo shaft 212 is connecting the second turbine 206 and the second compressor 210 to each other. The second turbine 206 is operated to rotate by the flow of combustion gases it receives, whereby the second compressor 210 rotates to pressurize a flow of air 214 fed into an inlet of the second compressor 210. In addition to the flow of combustion gases exposing the second turbo arrangement 202 to achieve a rotational motion, the rotation of the second turbo shaft 212 can be controlled to increase and/or decrease by other means than the flow of combustion gases from the internal combustion engine 10. Preferably, and according to an example, the controllable second turbo arrangement 202 comprises a second electric machine 220 configured to control the rotational speed of the second turbo shaft 212. The second turbo arrangement 202 may thus be referred to as a second electrically controlled turbo arrangement. According to an example, the second electric machine 220 is arranged between the second turbo 206 and the second compressor 210, i.e. the second electric machine 220 is arranged in, or constitutes, the second turbo shaft 212. Such second electric machine 220 preferably comprises a second rotor and a second stator.

In a similar vein as the first electric machine 120, the second electric machine 220 is preferably also connected to the above described control unit 140. Thus, the processor device of the control unit 140 is configured to control the rotational speed of the second turbo arrangement 202. The second electric machine 220 is also preferably connected to the energy storage 150 in order to received electric power for its propulsion.

After the combustion gases have entered the first 106 and second 206 turbines, the combustion gas 155 from the respective turbine converge at an interconnection portion 160 and flow towards an ambient environment. The flow of air 114, 214 entering the first 110 and second 210 compressors is pressurized and converges at a position 165 downstream each of the first 110 and second 210 compressors and fed into the first 16 and second 26 inlet manifolds of the internal combustion engine.

The above described engine system 100 with the first 102 and second 202 turbo arrangements in parallel can efficiently improve pulse utilization of the engine system to thereby improve an overall efficiency of the engine system 100. However, with turbines arranged in parallel, where the exhaust flow from the turbines converge at the position downstream the turbines, there is a risk that the turbo arrangements can negatively affect each other. For example, the pressure downstream the first turbine 106 may be lower than desired based on the pressure of the combustion gas exhausted from the second turbine 206. This may lead to a situation where one of the first 110 and second 210 compressors are exposed to a phenomena commonly referred to as surge.

Figure 3A:
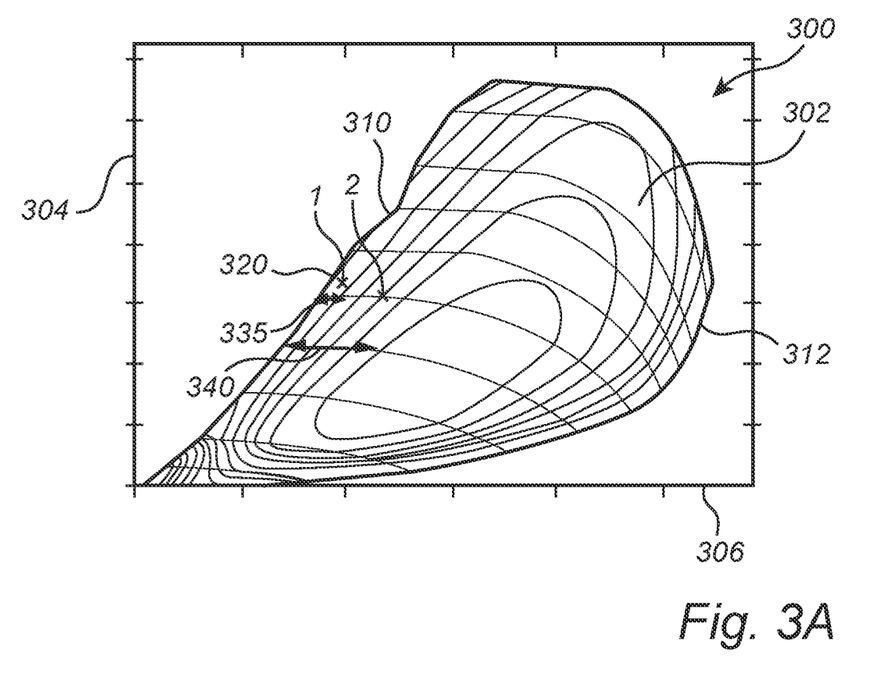
FIGS. 3A-3B are exemplary illustrations of a compressor map according to one example.
Figure 3B:
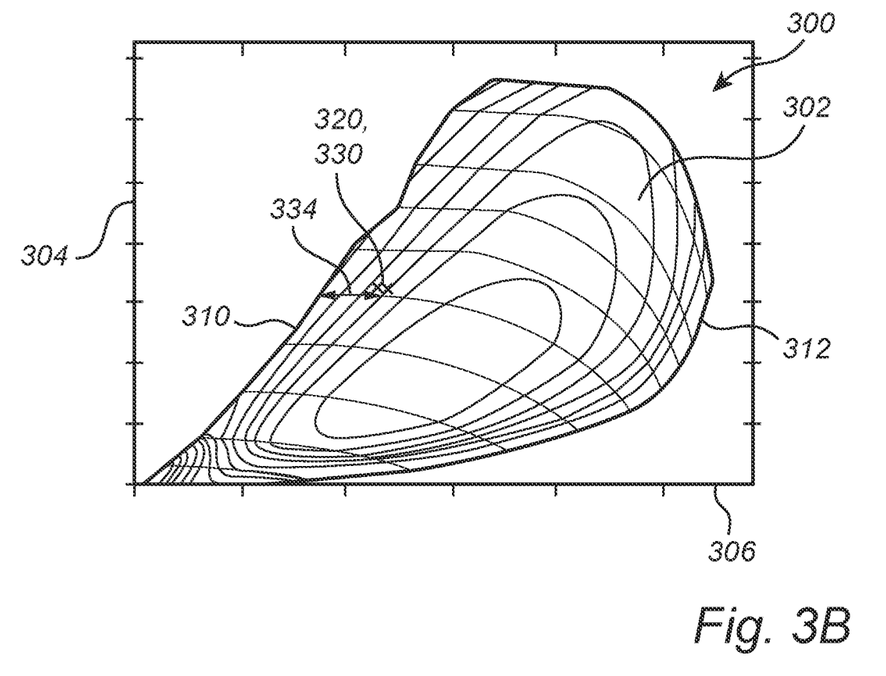

Reference is now made to FIGS. 3A-3B in order to describe a solution to at least partly mitigate the above potential problem associated with the first 102 and second 202 turbo arrangements in parallel. FIGS. 3A-3B are exemplary illustrations of a compressor map 300 according to one example. The compressor map 300 is preferably predefined and may be designed from compressor rig tests and/or predicted or estimated from simulations. The compressor map may be provided to the processor device of the control unit 140.

The compressor map 300 defines an area 302 in which a compressor is operated to increase the pressure of the air upstream the engine. The vertical axis 304 represent the pressure, or pressure ratio, and the horizontal axis 306 represents the mass flow. The area 302 is delimited by a surge line 310 and a choke line 312. When the pressure vs. mass flow of a compressor approaches the surge line 310 there is a risk that the compressor will stall. When the pressure vs. mass flow of a compressor approaches the choke line 312, the compressor will choke, reducing the efficiency.

During operation of the above-described engine system 100, the processor device of the control unit 140 determines a first pressure and a first mass flow of the air 114 pressurized by the first compressor 110. The processor device can hereby determine a first compressor map position 320, i.e. an instant compressor map position of the first compressor 110. In a similar vein, the processor device also determines a second pressure and a second mass flow of air 214 pressurized by the second compressor 210 to determine a second compressor map position 330. The second compressor map position 330 is thus an instant compressor map position of the second compressor 210.

As can be seen in FIG. 3A, the first compressor map position 320 is located close to the surge line 310. In detail, a distance 335 between the first compressor map position 320 and the surge line 310 is below a predetermined threshold distance. The second compressor map position 330 is however located at a sufficient distance 340 from the surge line 310, i.e. the distance 340 between the second compressor map position 330 and the surge line 310 is above the predetermined threshold distance.

In order to avoid the first compressor to stall, the processing circuitry controls the rotational speed of the first turbo arrangement 102 when determining that the distance 335 between the first compressor map position 320 and the surge line 310 is below the predetermined threshold distance. The first compressor map position 320 is hereby moved in the compressor map 300 as exemplified in FIG. 3B, such that the distance between the first compressor map position 320 and the surge line 310 is above the predetermined threshold distance. Preferably, the processor device transmits data to the first electric machine 120, whereby the first electric machine 120 controls the rotational speed of the first turbo arrangement.

In the example illustrated in FIGS. 3A-3B, the rotational speed of the first turbo arrangement 102 is thus controlled such that the air pressurized by the first compressor 110 assumes an updated compressor map position as indicated in FIG. 3B. According to a preferred example, the processor device may control the rotational speed of the first turbo arrangement 102 such that the first 320 and second 330 compressor map positions substantially coincide with each other.

The above description of FIGS. 3A-3B focus on an instant detection of the first compressor map position 320 being too close to the surge line 310. However, the processor device may also receive map data of the topography of the upcoming route for the vehicle. The processor device may hereby estimate that the first 320 compressor map position will be moved towards the surge line 310 when arriving at the upcoming route. The processor device may hereby in advance control the rotational speed of the first turbo arrangement 102 such that the first compressor map position is moved even further away from the surge line 310 before the vehicle 1 arrives at the upcoming route. A safety margin preventing the first compressor to stall is obtained.

Figure 4:
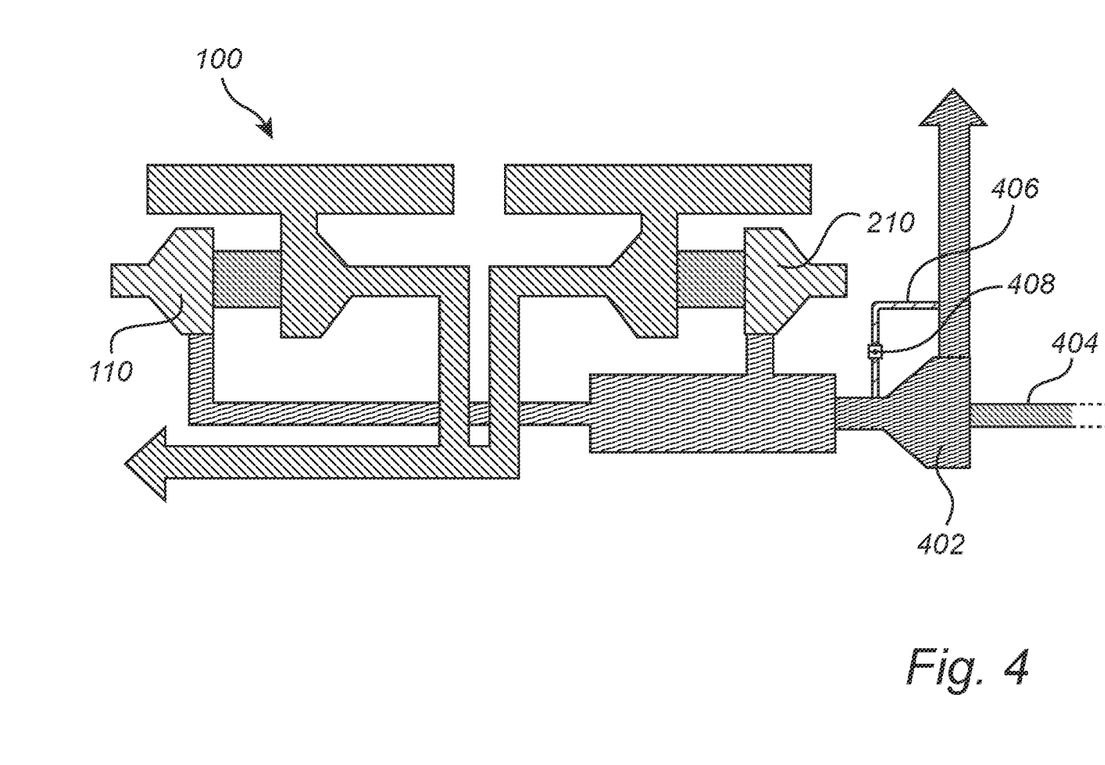
FIG. 4 is an exemplary illustration of an engine system according to one example.

Turning now to FIG. 4 which is an exemplary illustration of an engine system 100 according to one example. The engine system 100 in FIG. 4 comprises the same features as described above in relation to the description of FIG. 2, which features will not be described in further detail.

In addition to the features described above in relation to FIG. 2, the engine system 100 exemplified in FIG. 4 also comprises a secondary air pressure arrangement 402. The secondary air pressure arrangement 402 is arranged in downstream fluid communication with each of the first 110 and second 210 compressors. In detail, the secondary air pressure arrangement 402 receives the air pressurized by the first 110 and second 210 compressors. The secondary air pressure arrangement 402 is arranged to pressurize the air even further before feeding the pressurized air to the inlet manifold.

Figure 5:
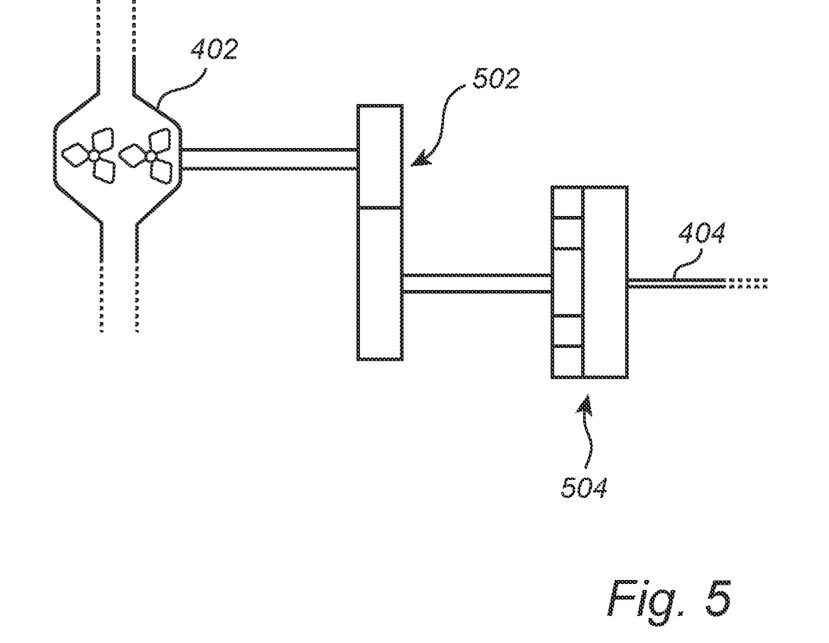
FIG. 5 is an exemplary illustration of a secondary air pressure arrangement according to one example.

The secondary air pressure arrangement 402 is preferably a mechanical supercharger which is connected and propelled by a crankshaft 404 of the internal combustion engine 10. The exemplified mechanical supercharger 402 is depicted as connected to the crankshaft by a fixed gear ratio, although a variable gear ratio is also conceivable, as is schematically illustrated in FIG. 5 where a gear stage 502 and a planetary gear set 504 is arranged between mechanical supercharger 402 and the crankshaft 404 for presenting a non-limiting example of a variable gear ratio. The variable gear ratio may also be obtained by other means than what is depicted in FIG. 5, such as a belt transmission, etc. FIG. 5 also illustrates the supercharger in the form of a roots blower. The roots blower should however also be applicable for the fixed gear stage depicted in FIG. 4. The secondary air pressure arrangement 402 can preferably be of a displacement type. Such secondary air pressure arrangement 402 may be able to match a piston engine which in itself is also a displacement pump. A continuous additional boost can be obtained for substantially the entire range of speed of revolution of the engine. A displacement type of secondary air pressure arrangement 402 may be advantageously combined with a hydrogen internal combustion engine since the risk of backfire in the engine is reduced. A technical benefit of a secondary air pressure arrangement 402 positioned downstream the first and second turbines is that an over-charging of the engine system 100 can be obtained, whereby an improved efficiency can be provided, in particular for an internal combustion engine operating with a high charge pressure. In further detail, boosting is provided together with the force obtained from the first and second turbines, whereby the electric motors of the first and second turbos can be used for controlling the position of the first compressor map position. This may be particularly advantageous for a hydrogen internal combustion engine.

As exemplified in FIG. 4, the engine system 100 also comprises a by-pass conduit 406. Hereby, pressurized air from the first 110 and second 210 compressors can bypass, either partly or completely, the secondary air pressure arrangement 402. The by-pass conduit 406 also comprises a by-pass valve 408 for controlling bypassing of the secondary air pressure arrangement 402.

Moreover, the engine system 100 in FIG. 4 also comprises a charge air cooler 410 downstream the first 110 and second 210 compressors and upstream the secondary air pressure arrangement 402. The temperature level of the air pressurized by the first 110 and second 210 compressors can hereby be reduced before entering the secondary air pressure arrangement 402.

Figure 6:
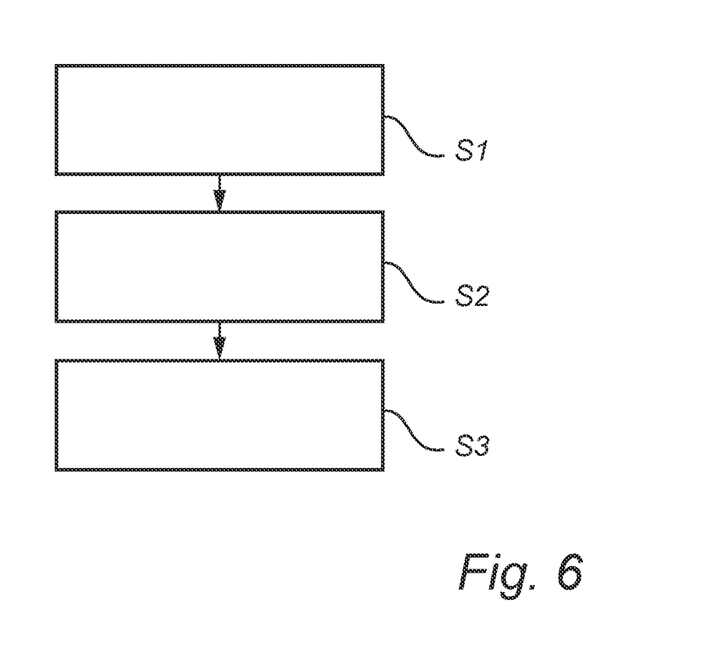
FIG. 6 is an exemplary illustration of a method of controlling an engine system according to one example.

To summarize and to describe a method of controlling the engine system 100 according to one example, reference is made to FIG. 6. As described above, during operation the processor device determines S1 a first pressure and a first mass flow of air pressurized by the first compressor 110, as well as a second pressure and a second mass flow of air pressurized by the second compressor 210. By the first pressure and first mass flow, the processor device determines S2 a first compressor map position 320 of the air pressurized by the first compressor 110. Thereafter, the processor device controls S3 the rotational speed of the first turbo arrangement 102 in response to the distance 335 between the first compressor map position 320 and the surge line 310 being below the predetermined threshold distance. The second turbo arrangement may obviously also be controlled if the second compressor map position is too close to the surge line.

Figure 7:
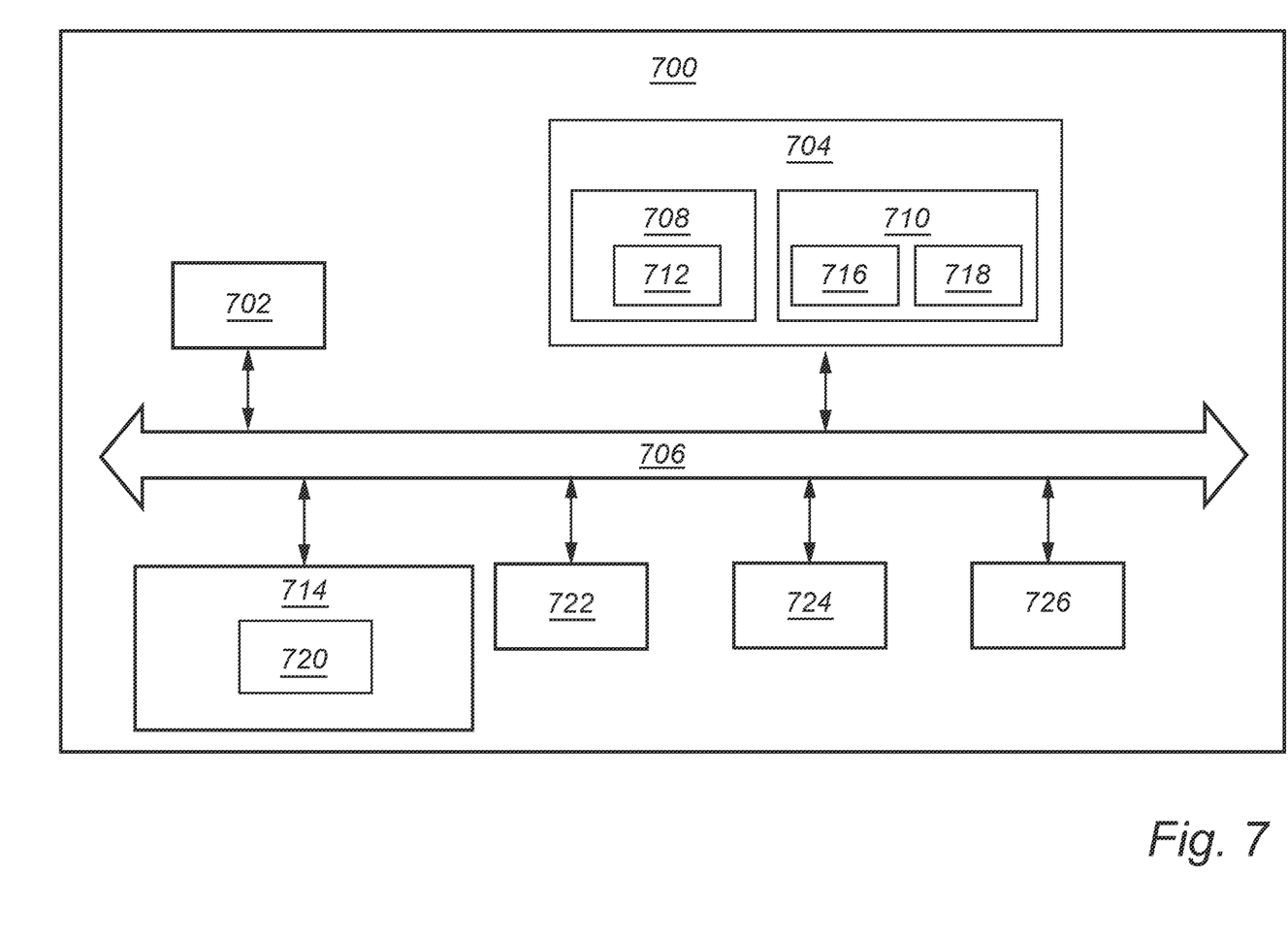
FIG. 7 is a schematic diagram of an exemplary computer system for implementing examples disclosed herein, according to one example.

Turning finally to FIG. 7 which is a schematic diagram of a computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include a processor device 702 (may also be referred to as a control unit), a memory 704, and a system bus 706. The computer system 700 may include at least one computing device having the processor device 702. The system bus 706 provides an interface for system components including, but not limited to, the memory 704 and the processor device 702. The processor device 702 may include any number of hardware components for conducting data or signal processing or for executing computer code stored in memory 704. The processor device 702 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processor device 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with a processor device 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program product 720 stored on a transitory or non-transitory computer-usable or computer-readable storage medium (e.g., single medium or multiple media), such as the storage device 714, which includes complex programming instructions (e.g., complex computer-readable program code) to cause the processor device 702 to carry out the steps described herein. Thus, the computer-readable program code can comprise software instructions for implementing the functionality of the examples described herein when executed by the processor device 702. The processor device 702 may serve as a controller or control system for the computer system 700 that is to implement the functionality described herein.

The computer system 700 also may include an input device interface 722 (e.g., input device interface and/or output device interface). The input device interface 722 may be configured to receive input and selections to be communicated to the computer system 700 when executing instructions, such as from a keyboard, mouse, touch-sensitive surface, etc. Such input devices may be connected to the processor device 702 through the input device interface 722 coupled to the system bus 706 but can be connected through other interfaces such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may also include a communications interface 726 suitable for communicating with a network as appropriate or desired.

EXAMPLE LIST

Example 1

An engine system for a vehicle, the engine system comprising:
a first turbo arrangement comprising a first turbine and a first compressor operably connected to each other, the first turbine being configured to be arranged in downstream fluid communication with an internal combustion engine,
a second turbo arrangement comprising a second turbine and a second compressor operably connected to each other, the second turbine being configured to be arranged in downstream fluid communication with the internal combustion engine and in parallel with the first turbine, wherein the first and second turbo arrangements are individually controllable, and
a control unit comprising a processor device operable to individually control a rotational speed of the first and second turbo arrangements, respectively, the processor device being configured to:
determine a first pressure and a first mass flow of air pressurized by the first compressor, and a second pressure and a second mass flow of air pressurized by the second compressor,
determine a first compressor map position of the air pressurized by the first compressor, the first compressor map position being a position, defined by the first pressure and the first mass flow, within a compressor map, the compressor map defining a surge line, and
control the rotational speed of the first turbo arrangement in response to a distance between the first compressor map position and the surge line being below a predetermined threshold distance.

Example 2

The engine system according to example 1, wherein the processor device is configured to, in response to the distance between the first compressor map position and the surge line being below the predetermined threshold distance, control the rotational speed of the first turbo arrangement such that the air pressurized by the first compressor assumes an updated compressor map position, wherein a distance between the updated compressor map position and the surge line is above the predetermined threshold distance.

Example 3

The engine system according to any one of examples 1 or 2, wherein the processor device is further configured to:
determine a second compressor map position of the air pressurized by the second compressor, the second compressor map position being a position, defined by the second pressure and the second mass flow, within the compressor map.

Example 4

The engine system according to example 3, wherein the processor device is further configured:
determine a first turbo rotational speed of the first turbo arrangement, the first turbo rotational speed providing a compressor map position of the air pressurized by the first compressor to substantially coincide with the second compressor map position, and
control the rotational speed of the first turbo arrangement by controlling the rotational speed of the first turbo arrangement to assume the first turbo rotational speed.

Example 5

The engine system according to any one of the preceding examples, wherein the first turbo arrangement is a first electrically controlled turbo arrangement.

Example 6

The engine system according to example 5, wherein the first electrically controlled turbo arrangement comprises a first electric motor between the first turbo and the first compressor.

Example 7

The engine system according to example 6, wherein the first electric motor is operably coupled to the processor device.

Example 8

The engine system according to any one of the preceding examples, wherein the second turbo arrangement is a second electrically controlled turbo arrangement.

Example 9

The engine system according to example 8, wherein the second electrically controlled turbo arrangement comprises a second electric motor between the second turbo and the second compressor.

Example 10

The engine system according to example 9, wherein the second electric motor is operably coupled to the processor device.

Example 11

The engine system according to any one of the preceding examples, further comprising a secondary air pressure arrangement arranged in downstream fluid communication with each of the first and second compressors.

Example 12

The engine system according to example 11, wherein the secondary air pressure arrangement is a mechanical supercharger operatively connectable to a crankshaft of the internal combustion engine.

Example 13

The engine system according to example 11, wherein the mechanical supercharger is operatively connectable to the crankshaft by a fixed gear ratio.

Example 14

The engine system according to example 11, wherein the mechanical supercharger is operatively connectable to the crankshaft by a variable gear ratio.

Example 15

The engine system according to any one of examples 11-14, further comprising a by-pass conduit bypassing the secondary air pressure arrangement.

Example 16

The engine system according to example 15, wherein the by-pass conduit comprises a by-pass valve.

Example 17

The engine system according to any one of the preceding examples, further comprising a charge air cooler arranged in downstream fluid communication with each of the first and second compressors.

Example 18

The engine system according to example 17 when dependent on any of examples 11-16, wherein the charge air cooler is arranged in upstream fluid communication with the secondary air pressure arrangement.

Example 19

The engine system according to any one of the preceding examples, wherein the processor device is further configured to:
  determine a lambda value of combustion gas exhausted from the internal combustion engine, and
  control the rotational speed of at least one of the first and second turbo arrangements in response to the lambda value being outside a predetermined lambda threshold range.

Example 20

A vehicle comprising an internal combustion engine and an engine system according to any one of the preceding examples, wherein the engine system is connected to internal combustion engine.

Example 21

The vehicle according to example 20, wherein the internal combustion engine is a hydrogen internal combustion engine.

Example 22

The vehicle according to any one of examples 20 or 21, wherein the internal combustion engine comprises at least a first exhaust manifold and second exhaust manifold, the first compressor being arranged in downstream fluid communication with the first exhaust manifold, and the second compressor being arranged in downstream fluid communication with the second exhaust manifold.

Example 23

A method of controlling an engine system connected to an internal combustion engine, the engine system comprising:
  a first turbo arrangement comprising a first turbine and a first compressor operably connected to each other, the first turbine being arranged in downstream fluid communication with the internal combustion engine, and
  a second turbo arrangement comprising a second turbine and a second compressor operably connected to each other, the second turbine being arranged in downstream fluid communication with the internal combustion engine in parallel with the first turbine, wherein the first and second turbo arrangements are individually controllable,
the method comprising:
  determining a first pressure and a first mass flow of air pressurized by the first compressor, and a second pressure and a second mass flow of air pressurized by the second compressor,
  determining a first compressor map position of the air pressurized by the first compressor, the first compressor map position being a position, defined by the first pressure and the first mass flow, within a predefined compressor map, wherein the predefined compressor map defines a surge line, and
  controlling the rotational speed of the first turbo arrangement in response to a distance between the first compressor map position and the surge line being below a predetermined threshold distance.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the inventive concept. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present inventive concept.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this inventive concept belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present inventive concept is not limited to the aspects described above and illustrated in the drawings; rather, the skilled person will recognize that many changes and modifications may be made within the scope of the present inventive concept and appended claims. In the drawings and specification, there have been disclosed aspects for purposes of illustration only and not for purposes of limitation, the scope of the inventive concepts being set forth in the following claims.

The invention claimed is:

1. An engine system for a vehicle, the engine system comprising:
    a first electrically controlled turbo arrangement comprising a first turbine and a first compressor operably connected to each other by a first turbo shaft, wherein the first turbo arrangement comprises a first electric machine configured to control a rotational speed of the first turbo shaft, the first turbine being configured to be arranged in downstream fluid communication with a first exhaust manifold coupled to a first cylinder package of an internal combustion engine,
    a second electrically controlled turbo arrangement comprising a second turbine and a second compressor operably connected to each other by a second turbo shaft, wherein the second turbo arrangement comprises a second electric machine configured to control a rotational speed of the second turbo shaft, the second turbine being configured to be arranged in downstream fluid communication with a second exhaust manifold coupled to a second cylinder package of the internal combustion engine and in parallel with the first turbine, wherein the first and second electrically controlled turbo arrangements are individually controllable, and
    a control unit comprising a processor device operable to individually control a rotational speed of the first and second electrically controlled turbo arrangements by controlling the first and second electric machines, respectively, the processor device being configured to:
    determine a first pressure and a first mass flow of air pressurized by the first compressor, and a second pressure and a second mass flow of air pressurized by the second compressor,
    determine a first compressor map position of the air pressurized by the first compressor, the first compressor map position being a position, defined by the first pressure and the first mass flow, within a compressor map, the compressor map defining a surge line, and
    control the first electric machine to control the rotational speed of the first electrically controlled turbo arrangement in response to a distance between the first compressor map position and the surge line being below a predetermined threshold distance.

2. The engine system according to claim 1, wherein the processor device is configured to, in response to the distance between the first compressor map position and the surge line being below the predetermined threshold distance, control the rotational speed of the first electrically controlled turbo arrangement such that the air pressurized by the first compressor assumes an updated compressor map position, wherein a distance between the updated compressor map position and the surge line is above the predetermined threshold distance.

3. The engine system according to claim 1, wherein the processor device is further configured to:
    determine a second compressor map position of the air pressurized by the second compressor, the second compressor map position being a position, defined by the second pressure and the second mass flow, within the compressor map.

4. The engine system according to claim 3, wherein the processor device is further configured:
    determine a first turbo rotational speed of the first electrically controlled turbo arrangement, the first turbo rotational speed providing a compressor map position of the air pressurized by the first compressor to substantially coincide with the second compressor map position, and
    control the rotational speed of the first electrically controlled turbo arrangement by controlling the rotational speed of the first electrically controlled turbo arrangement to assume the first turbo rotational speed.

5. The engine system according to claim 1, further comprising a secondary air pressure arrangement arranged in downstream fluid communication with each of the first and second compressors.

6. The engine system according to claim 5, wherein the secondary air pressure arrangement is a mechanical supercharger operatively connectable to a crankshaft of the internal combustion engine.

7. The engine system according to claim 5, wherein the mechanical supercharger is operatively connectable to the crankshaft by a fixed gear ratio.

8. The engine system according to claim 5, wherein the mechanical supercharger is operatively connectable to the crankshaft by a variable gear ratio.

9. The engine system according to claim 5, further comprising a by-pass conduit bypassing the secondary air pressure arrangement.

10. The engine system according to claim 1, further comprising a charge air cooler arranged in downstream fluid communication with each of the first and second compressors.

11. The engine system according to claim 1, wherein the processor device is further configured to:
determine a lambda value of combustion gas exhausted from the internal combustion engine, and
control the rotational speed of at least one of the first and second electrically controlled turbo arrangements in response to the lambda value being outside a predetermined lambda threshold range.

12. A vehicle comprising an internal combustion engine and an engine system according to claim 1, wherein the engine system is connected to internal combustion engine.

13. A method of controlling an engine system connected to an internal combustion engine, the engine system comprising:
a first electrically controlled turbo arrangement comprising a first turbine and a first compressor operably connected to each other by a first turbo shaft, wherein the first turbo arrangement comprises a first electric machine configured to control a rotational speed of the first turbo shaft, the first turbine being arranged in downstream fluid communication with a first exhaust manifold coupled to a first cylinder package of the internal combustion engine, and
a second electrically controlled turbo arrangement comprising a second turbine and a second compressor operably connected to each other by a second turbo shaft, wherein the second turbo arrangement comprises a second electric machine configured to control a rotational speed of the second turbo shaft, the second turbine being arranged in downstream fluid communication with a second exhaust manifold coupled to a second cylinder package of the internal combustion engine in parallel with the first turbine, wherein the first and second electrically controlled turbo arrangements are individually controllable,
the method comprising:
determining a first pressure and a first mass flow of air pressurized by the first compressor, and a second pressure and a second mass flow of air pressurized by the second compressor,
determining a first compressor map position of the air pressurized by the first compressor, the first compressor map position being a position, defined by the first pressure and the first mass flow, within a compressor map, wherein the compressor map defines a surge line, and
controlling the first electric machine to control the rotational speed of the first electrically controlled turbo arrangement in response to a distance between the first compressor map position and the surge line being below a predetermined threshold distance.

* * * * *